E. TRAUB.
CLUTCH.
APPLICATION FILED MAR. 29, 1912.

1,089,512.

Patented Mar. 10, 1914.

WITNESSES:
Leonard E. Fischer.
Géza L. Ferna

INVENTOR
Emil Traub,
BY
Henry J Miller
ATTORNEY

UNITED STATES PATENT OFFICE.

EMIL TRAUB, OF NEWARK, NEW JERSEY, ASSIGNOR TO THE SINGER MANUFACTURING COMPANY, A CORPORATION OF NEW JERSEY.

CLUTCH.

1,089,512.  Specification of Letters Patent.  Patented Mar. 10, 1914.

Application filed March 29, 1912. Serial No. 687,088.

*To all whom it may concern:*

Be it known that I, EMIL TRAUB, a citizen of the United States, residing at Newark, in the county of Essex and State of New Jersey, have invented certain new and useful Improvements in Clutches, of which the following is a specification, reference being had therein to the accompanying drawings.

This invention has for its object to provide a simple and effective clutch mechanism for use especially in connection with countershafts for automatic machines designed for operation at different rates of speed in different stages of a complete cycle.

According to the present invention, the clutch is constructed with primary and secondary members mounted for independent rotation, the one being formed with an axial clutch cavity and the other being adapted to enter said cavity and formed with a peripheral pocket or recess with one side eccentric to said cavity for reception of a clutch-roller carrying means whereby it is maintained in parallelism with the axis of said cavity. The peripherally recessed clutch member is preferably formed with a plurality of pockets for reception of a corresponding number of clutch-rollers each provided with a peripheral flange entering a lateral locking groove in the clutch-cavity whereby such rollers are retained in position without requiring the closure of the outer end of such cavity. By this means the clutch is made very simple in construction and its parts are easily assembled and the clutch-carrying parts may be readily replaced when desired.

Figure 1:
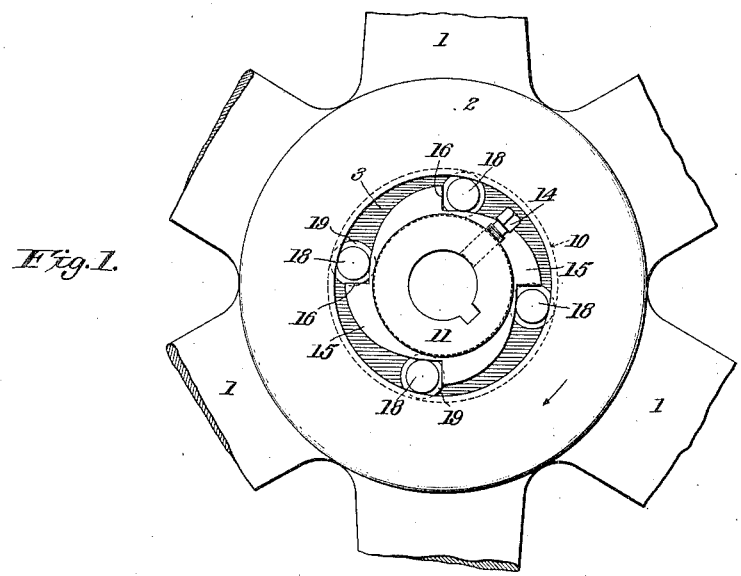
Figure 2:
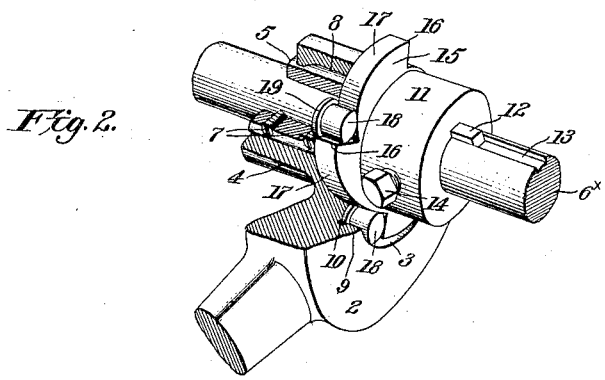
Figure 3:
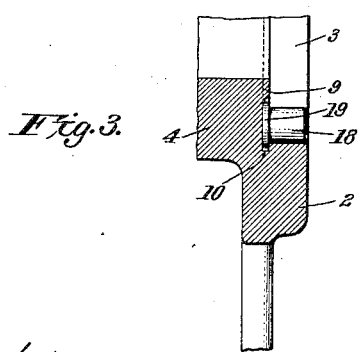

In the accompanying drawings, Figure 1 is a side view of a pulley showing the clutch elements in position; Fig. 2 is a partial sectional perspective view of the clutch elements; and Fig. 3 is a sectional view of a portion of one of the clutch members with one of the rollers mounted therein.

As represented in the drawings, the clutch-pulley 1 is provided at its outer end with the boss 2 in which is formed the clutch-cavity 3 and a hub 4 which is bored out to fit the bearing sleeve 5 adapted to be mounted upon the counter-shaft $6^x$ by means of set-screws 7. Said hub is provided in its inner face with the longitudinal oil-groove 8 to insure proper lubrication of the pulley 1 in its continuous rotary movement. The clutch-cavity 3 is provided with an axially projecting boss 9 and a peripheral groove 10.

The peripherally recessed clutch-collar 11 is adapted to be mounted upon the counter-shaft $6^x$ and is secured thereon by key 12 entering key-way 13 formed in said counter-shaft. Said clutch-collar 11 is further secured upon the counter-shaft by means of the set-screw 14. At one end of the clutch-collar 11 is formed lateral flange 15 provided with a series of peripheral notches or pockets each formed with an abrupt shoulder 16 and a curved side 17 eccentric to said collar and to the clutch-cavity 3 embracing the flange 15. Within each of said notches or pockets is disposed a cylindrical clutch-roller 18 provided upon its inner end with a flange 19 adapted to enter the groove 10 at one side, in which it is confined by means of the axially projecting boss 9 at the bottom of the clutch-cavity 3, sufficient clearance being provided between said boss and the opposite side of the roller-flange to permit the roller to be tilted slightly for its disengagement when the clutch-collar 11 is retracted from the open outer end of the clutch-cavity. Said boss or projection 9 serves to shield the faces of each roller flange 19 from the shearing action of clutch-collar 11. A removable ring, or its equivalent may be substituted for said boss.

It will be seen without further explanation that the rotation of pulley 1 in the direction represented by arrow in Fig. 1, causes the clutch-rollers 18 to jam between the inclined walls of their respective pockets and the periphery of the clutch-cavity, whereby the clutch-collar 11 and counter-shaft $6^x$ are rotated.

By the described construction, the clutch is adapted to be made simply and compactly, with an open ended clutch-cavity to facilitate introduction of the fixed clutch-member, thereby making it unnecessary to remove any parts in assembling the component elements of the clutch. This is important in connection with previously installed countershafts which are frequently more or less unaccessible so as to render it difficult to take apart and assemble the clutch elements for renewal or for other purposes. By providing locking means directly upon the clutch-rollers, these are prevented from escaping from the clutch-cavity in the normal operation of the clutch, and the peripheral flanges thereon, by their engagement with the outer wall of the housing grooves 16 therefor, serve to maintain the parallelism of the rollers with the axis of the cavity and the countershaft so as to prevent any cramping action which would impair the effectiveness of the clutch. The flanges of said clutch-rollers are shielded from contact with collar 11 by means of boss 20 so as to avoid the wearing down of said flanges which would permit said rollers to move out of parallelism with the clutch-cavity and consequently render faulty the action of the clutch.

Having thus set forth the nature of the invention, what I claim herein is:—

1. In a clutch, the combination with primary and secondary members mounted for independent rotation upon a common axis, the one formed with an axial clutch-cavity and the other entering and embraced by said clutch-cavity and formed with a peripheral pocket having one side eccentric to said cavity, of a clutch-roller disposed in said pocket and adapted for engagement with the adjacent wall of said cavity and means independent of said secondary member whereby the clutch-roller is maintained in parallelism with the axis of said cavity.

2. In a clutch, the combination with primary and secondary members mounted for independent rotation upon a common axis, the one formed with an open-ended axial clutch-cavity containing a locking element and an annular projection at its inner end, and the other entering and embraced by said clutch-cavity and formed with a peripheral pocket having one side eccentric to said cavity, of a clutch-roller disposed in said pocket and adapted for engagement with the adjacent wall of said cavity and provided with a locking element coöperating with that of said cavity whereby said roller is positively confined within said cavity.

3. In a clutch, the combination with primary and secondary members mounted for independent rotation upon a common axis, the one formed with an open-ended axial clutch-cavity having a peripheral groove and an annular projection at its inner end, and the other entering and embraced by said clutch-cavity and formed with a plurality of peripheral pockets each having one side eccentric to said cavity, of clutch-rollers disposed in said pockets and each adapted for engagement with the adjacent wall of said cavity and provided with a peripheral flange entering said groove of the clutch-cavity.

4. In a clutch, the combination with primary and secondary members mounted for independent rotation upon a common axis, the one formed with an open-ended axial clutch-cavity having in its inner end a projecting boss and in its periphery a groove surrounding said boss and the other member entering and embraced by said clutch-cavity and formed with a plurality of peripheral pockets each having one side eccentric to said cavity, of clutch-rollers disposed in said pockets and each adapted for engagement with the adjacent wall of said cavity and provided with a peripheral flange entering said groove of the clutch-cavity and adapted for engagement also with said boss.

5. In a clutch, the combination with primary and secondary members adapted for support independent of each other upon a common axis, the one formed with an axial clutch-cavity containing a peripheral groove and the other entering said clutch-cavity and formed with peripheral pockets each having one side eccentric to said cavity, of clutch-rollers disposed in said pockets each provided with a peripheral flange entering said groove in the clutch-cavity, and means whereby the faces of said flanges are shielded from contact with said secondary member.

In testimony whereof, I have signed my name to this specification, in the presence of two subscribing witnesses.

EMIL TRAUB.

Witnesses:
HENRY J. MILLER,
HENRY A. KORNEMANN, Jr.